March 3, 1959          J. DOLZA          2,875,742
ECONOMY ENGINE AND METHOD OF OPERATION
Filed Sept. 10, 1956          5 Sheets-Sheet 1
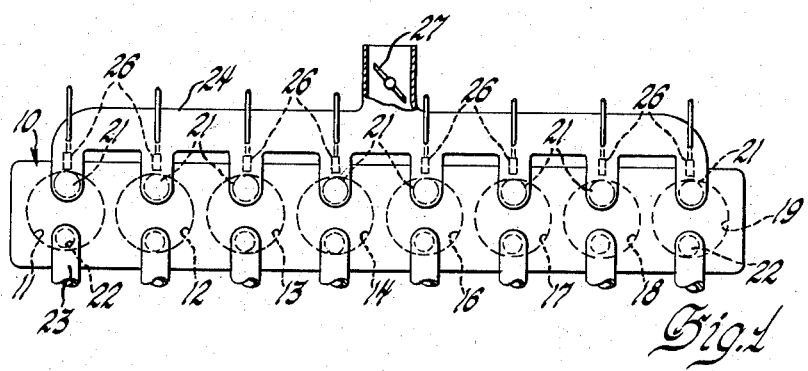
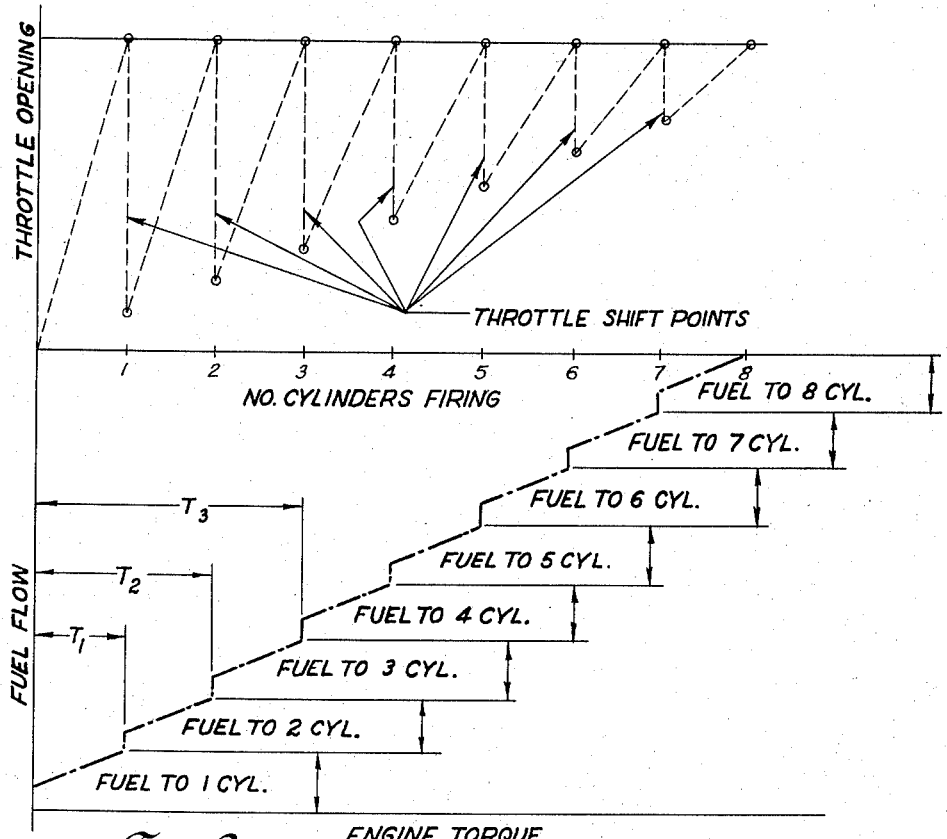
INVENTOR.
John Dolza
BY
ATTORNEY March 3, 1959  J. DOLZA  2,875,742
ECONOMY ENGINE AND METHOD OF OPERATION
Filed Sept. 10, 1956  5 Sheets-Sheet 2

INVENTOR.
John Dolza
BY
L. D. Burch
ATTORNEY

March 3, 1959  J. DOLZA  2,875,742
ECONOMY ENGINE AND METHOD OF OPERATION
Filed Sept. 10, 1956  5 Sheets-Sheet 3
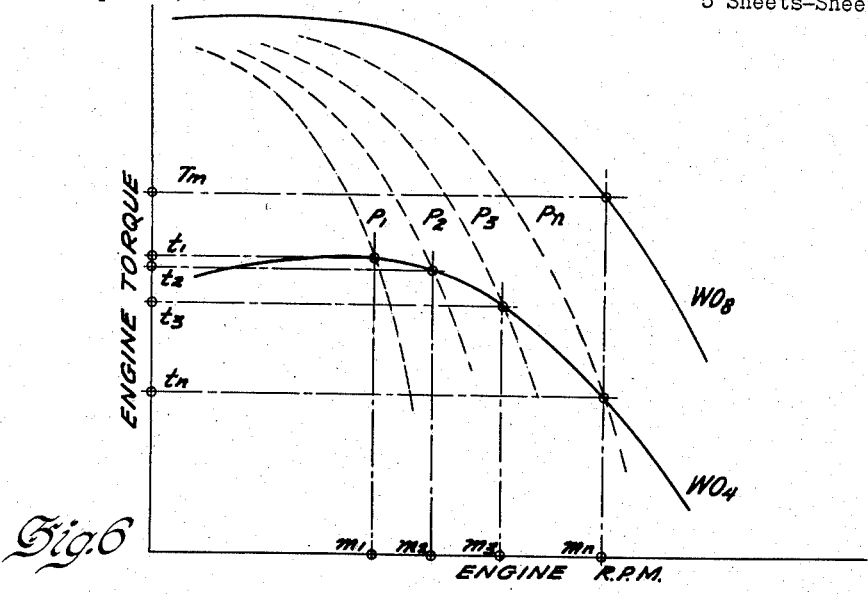
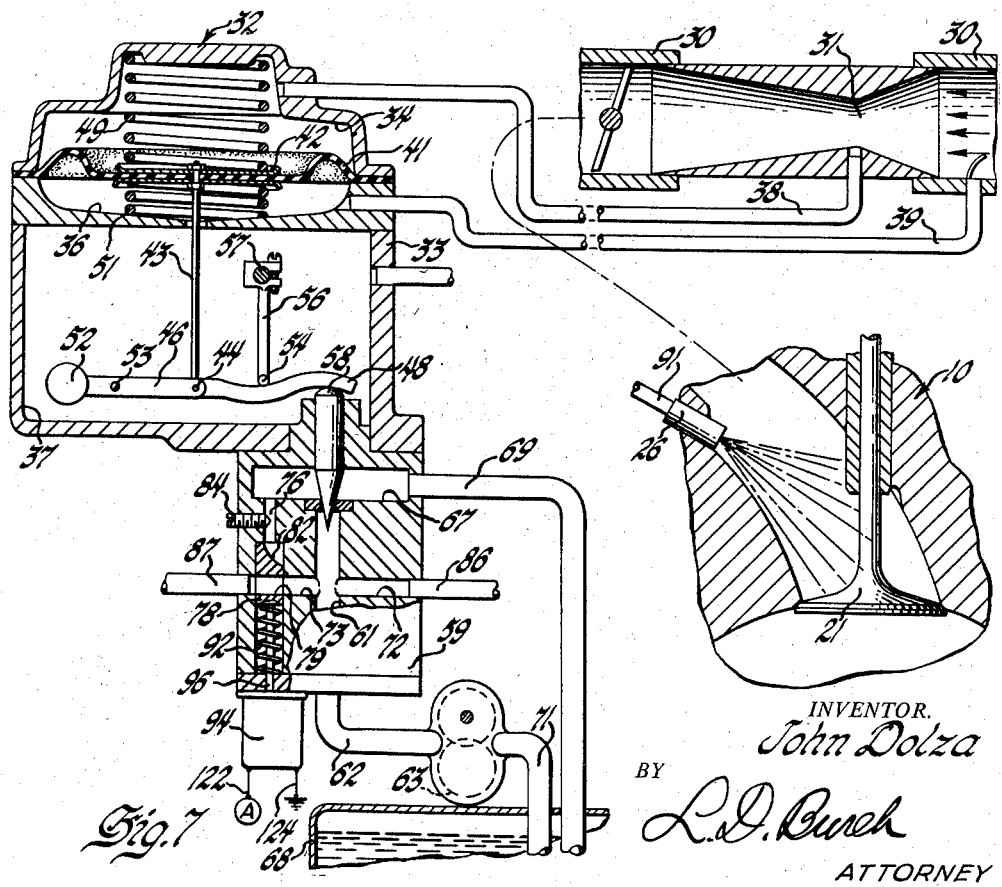
INVENTOR.
John Dolza
BY
L.D. Burch
ATTORNEY March 3, 1959
J. DOLZA
2,875,742
ECONOMY ENGINE AND METHOD OF OPERATION
Filed Sept. 10, 1956
5 Sheets-Sheet 4
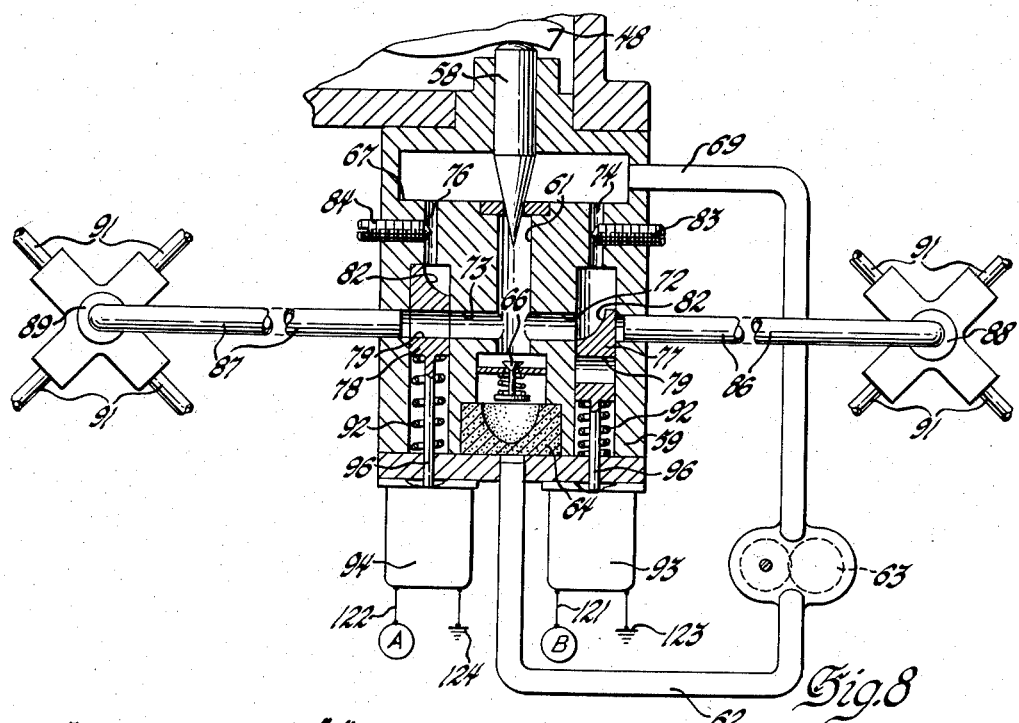
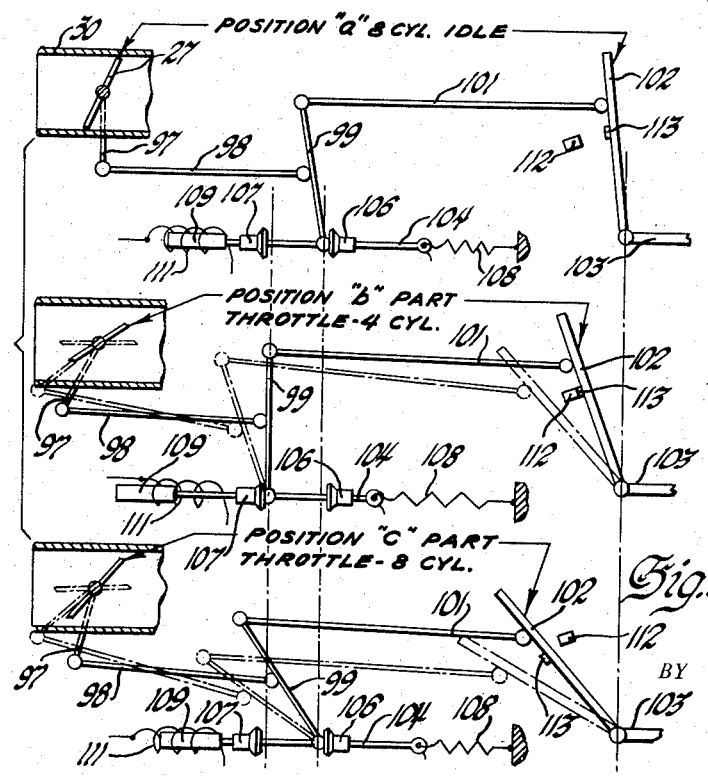
INVENTOR.
John Dolza
BY
*L. D. Burch*
ATTORNEY March 3, 1959  J. DOLZA  2,875,742
ECONOMY ENGINE AND METHOD OF OPERATION
Filed Sept. 10, 1956  5 Sheets-Sheet 5

INVENTOR.
John Dolza
BY
L. D. Burch
ATTORNEY

United States Patent Office 2,875,742
Patented Mar. 3, 1959

2,875,742

ECONOMY ENGINE AND METHOD OF OPERATION

John Dolza, Fenton, Mich., assignor to General Motors Corporation, Detroit, Mich., a corporation of Delaware Application September 10, 1956, Serial No. 608,828

9 Claims. (Cl. 123—119)

The invention relates to means for improving the fuel economy of multiple cylinder engines, particularly four stroke cycle engines in which the cylinders are individually supplied with fuel either at the intake ports or otherwise.

It is characteristic of four stroke cycle engines to more efficiently produce power in the higher load ranges. To take advantage of this it is proposed to utilize less than the total number of cylinders in producing the output required so that the cylinders that are utilized will operate in the higher efficiency ranges.

In the drawings:

Figure 1 is a diagrammatical illustration of a four stroke cycle, multiple cylinder, port injection, internal combustion engine in which the invention may be embodied.

Figure 2 is a graphical illustration of the way in which the fuel and air may be supplied to the cylinders of the engine disclosed in Figure 1.

Figure 6 is a graphical illustration of the relation between torque and engine speed in an engine embodying the invention.

Figure 7 is a diagrammatical illustration of the fueling system embodied in the engine disclosed by Figure 1.

Figure 8 is a fragmentary view illustrating a modification of the structure disclosed by Figure 7.

Figure 9 is a graphical illustration of the throttle control mechanism embodied in the engine disclosed by Figure 1.

Figure 3:
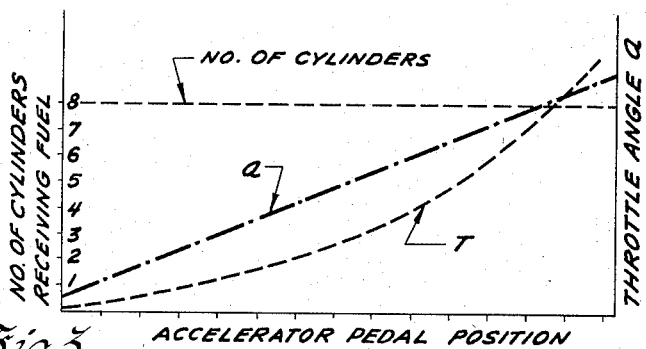
Figures 3, 4 and 5 illustrate graphically (a) the number of cylinders firing, (b) the engine throttle opening, and (c) the torque produced by movement of the accelerator pedal or hand throttle lever of an engine such as the eight cylinder engine disclosed by Figure 1.

The engine 10, embodied in the structure disclosed by Figure 1, has cylinders 11, 12, 13, 14, 16, 17, 18 and 19, adapted to fire in any suitable order. The cylinders have inlet valves 21 and exhaust valves 22, there being any desired number of inlet and exhaust valves for each cylinder. The exhaust valves 22 are adapted to discharge the products of combustion to the atmosphere through exhaust passages 23, which may be connected to an exhaust manifold for the engine, if such as desired. The inlet valves 21 are adapted to supply charges of fuel and air to the cylinders of the engine, the air through an air manifold 24, the fuel through metering nozzles 26. The air manifold 24 is controlled by a throttle 27. The engine 10 may be timed in any suitable manner to operate as a four stroke cycle, internal combustion engine. Suitable ignition means may be provided for the charges compressed by the cylinders 11 to 19 of the engine.

The engine 10 may be operated as is illustrated by Figure 2, by supplying fuel to an increasing number of the cylinders of the engine as the torque demand on the engine increases. When the fuel is supplied to only one of the cylinders of the engine, the first increment of torque $T_1$ may be obtained by opening the throttle from idle to wide open position. To provide a uniformly and continually increasing torque above $T_1$, the second cylinder may be brought into operation by supplying fuel simultaneously to two cylinders and simultaneously closing the throttle to a position that will produce a torque from the two cylinders, equal to $T_1$. Thereafter to obtain maximum power from the two cylinders the throttle may be opened to a new position indicated at $T_2$. The process may be repeated until all cylinders are called into operation to produce the maximum torque of the engine.

This type of torque or power control may be applied to an engine in steps, using a greater number of cylinders for each torque increment. For example, an eight cylinder engine may operate at lower loads on four cylinders and at higher loads on all eight cylinders. A twelve cylinder engine may operate on four, six or twelve cylinders, and a sixteen cylinder engine on four, eight and sixteen cylinders, or eight and sixteen cylinders. In this way uniform firing impulses will provide smoother engine operation while in the lower load ranges.

With fuel injection to individual cylinders or to the cylinder intake ports, improved fuel economy at part load operating conditions may be achieved by supplying the proper combustible mixture to alternate cylinders in the firing order between idle and the full torque obtainable from half the cylinders of the engine. If further torque increase is called for, the remaining cylinders may be supplied with fuel for the higher loads.

Figure 4:
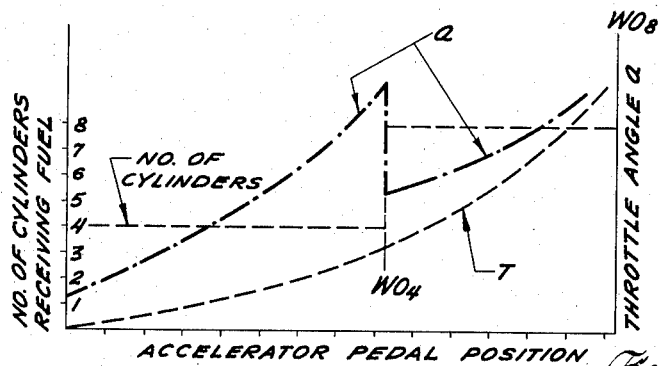
Figure 5:
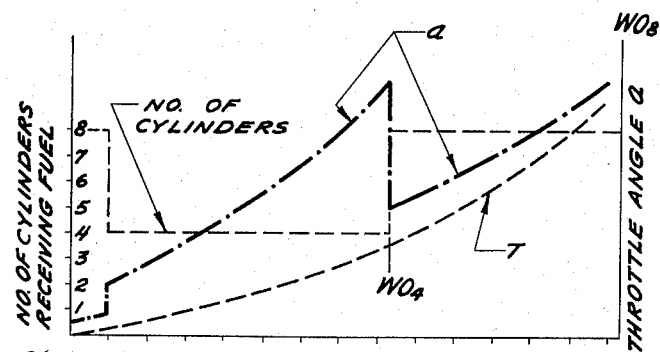

Figure 3 illustrates a conventional engine with all cylinders firing throughout the range of operation for the engine. Figure 4 illustrates how idle and part load operating conditions may be obtained from four cylinders operating up to the wide open position of the throttle. The wide open position of the throttle for four cylinders is illustrated at $WO_4$, where the engine torque may be somewhat less than half the full load torque for all cylinders. Further depression of the throttle control will first partially close the throttle as the remaining cylinders begin to fire, then will open the throttle to $WO_8$ position, to produce the next increment of torque. Figure 5 illustrates the operation of an engine with all cylinders firing at idle for smooth operation, as would be desirable in the operation of engines for passenger vehicles. The shift to four cylinders at off-idle position of the throttle will then provide economical operation in the low torque range. In Figure 6, the curve $WO_4$ indicates the torque while operating on four cylinders and $WO_8$ the torque with eight cylinders firing. The curves $p_1$, $p_2$, $p_3$ and $p_n$ illustrate a family of part throttle curves which will result from the operation of the engine at throttle positions $t_1$, $t_2$, $t_3$ and $t_n$. It will be noted that curve $p_1$ intersects $WO_4$ at $m_1$ and $p_n$ at $m_n$. A progressive increase in the torque from minimum to maximum may be obtained by operating at increasing throttle openings with four cylinders and up to $WO_4$, at which the torque will be $t_n$. Continuing the torque increase requires supplying fuel to the remainder of the cylinders simultaneously as the throttle is closed to $p_n$, followed by a reopening of the throttle to obtain maximum power at $T_m$.

The fueling system selected for employment in the illustrated embodiment of the invention is a mass air flow system as shown by Figure 7, this being a diagrammatic illustration of the fueling system embodied in application Serial No. 591,889 filed in the United States Patent Office June 18, 1956, in the name of John Dolza. Any other suitable fueling system may be employed, such as the speed density system disclosed by application Serial No.

591,450 filed in the United States Patent Office June 14, 1956, in the name of John Dolza.

The fueling system illustrated by Figure 7 embodies a manifold inlet 30 in which a throttle valve 27 may be employed for controlling the flow of air supplied to the engine 10. The manifold inlet includes a venturi 31 which provides an index of the quantity of air which the throttle valve 27 allows to flow to the cylinders of the engine through the manifold 24. To employ such index in controlling the supply of fuel to the engine, it is proposed to employ a fuel control device or means such as that indicated at 32. The device 32 includes a casing 33 in which pressure chambers 34 and 36 and a valve operating mechanism chamber 37 are formed. The chamber 34 is connected to the throat of the venturi 31 by a conduit 38 while the chamber 36 is connected by conduit 39 to the manifold inlet 30 anterior to the venturi 31. A diaphragm 41 separates chambers 34 and 36 and is responsive to the difference in pressure indicated by the conduits 38 and 39. The diaphragm 41 is secured between a pair of plates 42 to a rod 43 which transfers the movement of the diaphragm to a pivot 44 between a pair of levers 46 and 48. The position of the diaphragm 41 is balanced in any suitable manner by a pair of springs 49 and 51 disposed between the plates 42 and opposite ends of the chambers 34 and 36. The lever 46 is balanced by a weight 52 on a pin 53 supported by the casing 32. The lever 48 is supported at 54 on a lever 56 pivotally mounted in the casing 33 on pin 57. The pin 57 may be rotated in any suitable manner to vary the fuel and air mixture supplied to the cylinders for full power operation of the engine. The opposite end of the lever 48 engages a bypass valve 58 the end of which extends into a fuel distribution chamber 61 formed in a valve body 59 secured to the lower part of the casing 33. The valve 58 is adapted to control the bypass of fuel from the distribution chamber 61, which is supplied with fuel by a conduit 62 communicating with the outlet side of an engine operated fuel pump 63. The fuel supplied to the distribution chamber 61 may pass through a filter 64 and a check valve 66.

It will be apparent that the greater the flow of air through the manifold inlet 30, the greater will be the tendency of the diaphragm 41 to close the valve 58 to prevent the bypass of fuel from the distribution chamber 61. The fuel which is so bypassed by the valve 58 flows into a fuel collecting chamber 67 formed in the body 59, from which it is returned to the fuel tank 68 by a fuel return conduit 69. Fuel from the tank 68 is supplied to the pump 63 by a fuel supply conduit 71. The fuel which is not bypassed by the valve 58 and returned to the tank through the conduit 69 may be distributed to the cylinders of the engine through fuel supply passage 72 and 73, or may be returned to the chamber 67 for return to the tank through conduit 69 by bypass passages 74 and 76. Whether the fuel is supplied to the engine or returned to the tank, in the modification disclosed by Figure 8, is determined by the position of bypass valves 77 and 78 which are mounted in the body 59 in positions either to cut off the flow of fuel to the engine through the passages 72 and 73 or to cut off the bypass passages 74 and 76. The valves 77 and 78 have ports 79 adapted to provide a continuous flow of fuel through the distribution passages 72 and 73 and have ports 82 adapted to provide continuous communication with the bypass passages 74 and 76. The bypass passages 74 and 76 are intersected by metering screws 83 and 84 mounted in the body 59 and adapted to adjust the restriction to flow of the passages 74 and 76 to equal the restriction to flow to the engine through the distribution passages 72 and 73. The passages 72 and 73 are adapted to be connected by conduits 86 and 87 to fuel distribution couplings 88 and 89 for supplying different groups of cylinders of the engine. In the present instance it is proposed to supply the cylinders of the engine in two groups of four cylinders each.

The fuel supply or metering jets 26 for the cylinders in each group are connected to the distribution couplings 88 by conduits 91. Springs 92 tend to position the valves 77 and 78 to provide continuous communication through the passages 72 and 73. Solenoids 93 and 94 mounted on the valve body 59 and having the cores thereof connected to the valves 77 and 78 by rods 96, tend to move the valves 77 and 78 when energized, to provide communication between the distribution passages 72 and 73 and the bypass passages 74 and 76.

The positions of the throttle valve 27 in the manifold inlet passage 30 for a series of events that may occur during the operation of the engine is illustrated by Figure 9. The throttle may be operated by a lever 97 connected by a link 98 to a lever 99. One end of the lever 99 may be connected by a link 101 to an accelerator pedal 102, pivoted to the floor of a vehicle or support 103. The opposite end of the lever 99 is pivotally secured to a rod 104 that is slidably mounted in stops 106 and 107. One end of the rod 104 is secured to the body of the vehicle 103 by a tension spring 108, while the other end thereof is formed to provide a core 109 for a solenoid 111. The accelerator pedal 102 when depressed is adapted to engage an electrical contact bar 112 for closing a circuit through the solenoid 111. When the circuit is closed through the solenoid 111, the rod 104 will be moved to further tension the spring 108 and to move the lever 99 in a direction to open the throttle 27. When the solenoid 111 is not energized, the spring 108 will move the rod 104 to move the lever 99 in a direction to close the throttle 27.

Figure 10:
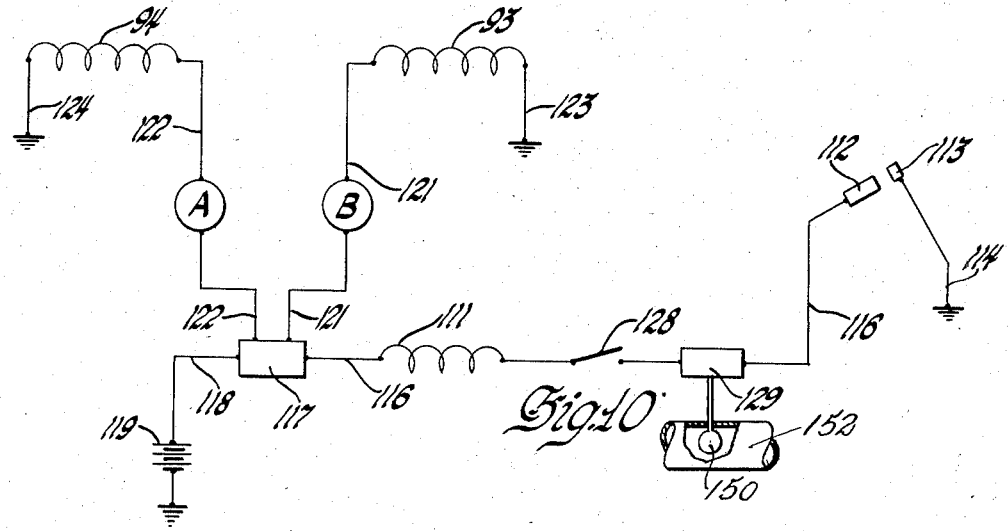
Figure 10 is a circuit diagram illustrating the electrical devices embodied in the structure disclosed by Figures 7 and 9.

Figure 10 illustrates the wiring diagram for the circuit including the solenoid 111 and the contact bar 112. This circuit includes an electrically conductive bar 113 mounted on one side of the accelerator pedal 102. One end of the bar 113 is grounded at 114, the opposite end being adapted to engage the contact bar 112 as the accelerator pedal 102 is moved into a predetermined position. The bar 112 is connected by a conductor 116 to the solenoid 111 and through the solenoid 111 to a sequential switch 117 having outlets A and B. The sequential switch is connected by a conductor 118 to a battery 119. The outlets A and B are provided by conductors 121 and 122 connected to the solenoids 93 and 94, respectively. The solenoids 93 and 94 are grounded, respectively, at 123 and 124. The sequential switch 117 is adapted to supply current alternately to the solenoids 93 and 94 and continuously to the solenoid 111, when contact is made by the accelerator pedal 102 between the contact bars 113 and 112.

Figure 12:
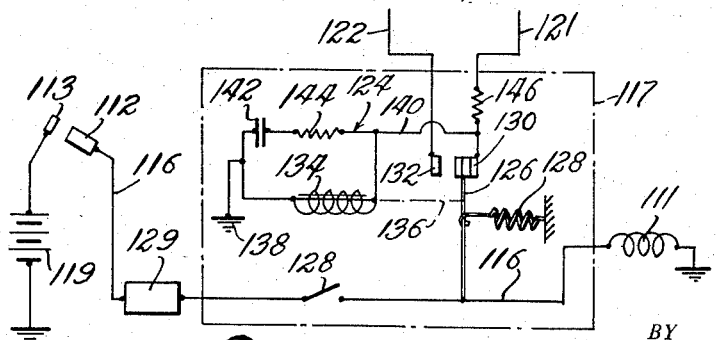
Figure 12 is a detail of the sequentially operating switch.

A more detailed disclosure of the electrical circuit shown in Figure 10 and particularly that portion including the sequential switch 117 is shown in Figure 12. Switch 117 includes a circuit indicated generally at 124 which is adapted to secure the alternating supply of current to the solenoids 93 and 94. Circuit 124 includes a movable contact member 126 connected to lead 116 and biased by a spring element 128 into engagement with a fixed contact 130 at one end of solenoid lead 121. A second contact 132 is spaced from contact 130 and is connected to the terminal end of solenoid lead 122. Thus, as the movable contact 126 is alternately moved between contacts 130 and 132 current will alternately flow to the solenoids 93 and 94. A relay 134 includes an armature 136 articulated at one end to the movable contact 126 and is adapted, when energized, to move the latter contact into engagement with contact 132. One end of relay 134 is grounded at 138. The other end of relay 134 is connected through a lead 140 to solenoid lead 121.

In order to insure sequential operation of the movable contact 126 a hold circuit is provided in parallel with the relay 134 and includes a condenser 142 and a resistance 144. When the movable contact is in the position shown in Figure 12, current will flow through the solenoid lead 121 and also through lead 140 to charge the condenser 142. When the condenser is suitably charged relay 134 will be energized moving the contact 126 into engagement with contact 132 causing solenoid 94 to be energized. Upon the engagement of contacts 126 and 132 the flow of charging current through lead 140 will be discontinued, however, condenser 142 will continue to discharge maintaining the relay 134 in an energized condition until the voltage across the relay becomes insufficient to overcome the spring 128 at which time the contact 126 will again be moved into engagement with contact 130. In this way it will be seen that the current will alternately flow through solenoid leads 121 and 122, respectively. A resistance 146 is interposed in lead 121 to insure that the condenser 142 will discharge across the relay 134 rather than discharging across solenoid 93.

In order that the alternator circuit 124 be operative only after the switches 112—113, 128 and 129 are closed, supra, these switches are interposed in series between the battery 119 and the movable contact 126 as shown in Figure 12. It is to be understood that any suitable type of means for alternating the current between solenoid 93 and 94 may be provided and that the circuit 124 is merely illustrative of one such type of alternating device which may be employed.

By alternating between groups of cylinders, as is possible through means such as switch 117, the wear is equalized between all the cylinders. Further, the alternating operation of cylinder groups reduces the possibility of spark plug fouling as would otherwise occur if the same group of cylinders were always inoperative during split or economy engine operation.

The periodicity or frequency of alternation between cylinder groups may vary over a considerable time or operational period depending on particular engine operating characteristics. The frequency could be several alternations per minute achieved by varying the capacity of condenser 142 and/or the resistance of element 144 in the illustrative circuit of Figure 12. If considerably less alternation were required it would be possible to modify the electrical circuit to cause alternation to take place each time the engine alternated between all and part cylinder operation.

Figure 11:
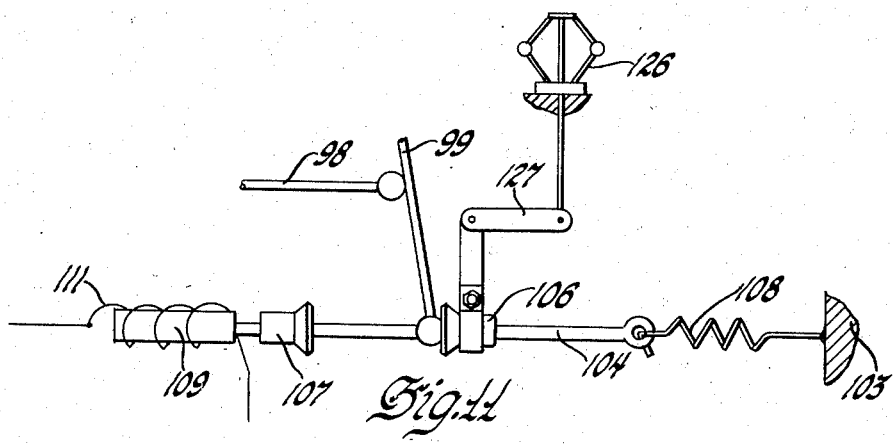
Figure 11 is a diagrammatical illustration of an engine speed governor employed in the operation of the throttle control mechanism disclosed by Figure 9.

Figure 11 illustrates an engine driven governor 126 for determining the position of the stop 106 for determining the limit of movement of the throttle actuating lever 99, when the solenoid 111 is not energized and when the throttle tends to be closed in response to the tension of the spring 108. The governor 126 is connected to the stop 106 by a lever 127 in such manner as to tend to limit the closing movement of the throttle 27 as the engine speed decreases.

It may be considered desirable under certain circumstances to operate on all of the cylinders of the engine at all engine loads. For this purpose it is proposed to provide a manual throw-out switch 128 in the circuit including the solenoids 111, 93 and 94. It may also be desirable to operate the engine on all the cylinders of the engine until the engine warms up. For this purpose a thermostatically actuated switch 129 is provided in the circuit including solenoids 93, 94 and 111. The thermostatic switch 129 is mounted on the engine 10 and will not close the circuit until the temperature of the engine has sufficiently increased. The thermostatic switch 129 may be actuated by any suitable means reflective of engine temperature. For purposes of illustration, this may be achieved by a temperature responsive bulb member 150 suitably disposed in a portion of the engine water jacket 152.

The engine 10 may be operated on four cylinders or eight cylinders, merely by operating the accelerator pedal 102 controlling the engine. In the position "A" shown in Figure 9 the accelerator pedal is at engine idling position in which there is no contact between the contact bars 112 and 113. Under such circumstances there will be no circuit through the solenoids 93, 94 and 111. The adjustable lever 99 will be at position $a$ and valves 77 and 78 will be in the positions in which valve 77 is shown in Figure 7. In such positions the valves 77 and 78 provide open communication with the fuel jets for all of the cylinders of the engine through passages 72 and 73. The engine therefore will run on all of the eight cylinders of the engine. However, when the accelerator pedal 102 is depressed to position $b$ as illustrated by Figure 9, the contact bars 112 and 113 will close the circuit through solenoid 111 and the sequential switch 117 will connect one or the other of the solenoids 93 or 94 to the battery 119. Figure 7 shows the valve 77 in the position occupied when the solenoid 93 is energized. In this position the valve 77 will bypass the fuel supplied by the passage 72 through the bypass passage 74 and to the tank 68. The metering screw 83 will be adjusted to provide a restriction in the bypass passage 74 equal to the restriction of the system including the four nozzles 26 supplying the four cylinders of the engine 10 through the distribution coupling 88 and the conduits 91. The fuel pressure in the distribution chamber 61 therefore will not change regardless of the position of the valve 77 and even though fuel is not being supplied to four of the cylinders of the engine. However, it is now desirable to supply as much fuel to four of the cylinders of the engine as was previously supplied to all of the cylinders of the engine. This is done by changing the position of the lever 99. When the solenoid 111 is energized, the lever 99 will change from position $a$ to position $b$ thereby causing a further opening movement of the throttle valve 27. This will allow more air to flow to the engine and such increase in the quantity of air supplied to the engine will increase the difference in pressure between the pressure chambers 34 and 36. This will tend to operate the lever 48 to further close the valve 58 to provide an increased restriction to the bypass of fuel from the distribution chamber 61. This will increase the fuel pressure in the chamber 61 to supply as much fuel to the remaining four cylinders of the engine as was previously supplied to the eight cylinders of the engine. It may be noted that the four cylinders of the engine not supplied with fuel still will pump air so that it is necessary to further open the throttle valve 27 to provide additional air for the engine. The amount of air required by the engine under such circumstances is as much as was previously supplied to the eight cylinders of the engine, this amount being required to burn the fuel previously supplied to the eight cylinders of the engine, plus the amount of air pumped by the four cylinders not supplied with fuel. At position $b$ the accelerator pedal 102 may be depressed until the four cylinders of the engine now being supplied with fuel are operating at maximum torque and under which circumstances the engine will be operating at a greater efficiency than were all the cylinders of the engine operating. At maximum torque for the four operating cylinders of the engine a further depression of the accelerator pedal 102 will cause the accelerator pedal to move beyond the contact bar 112, thereby breaking the circuit through the contact bars 112 and 113 and through the solenoids 93 or 94 and 111. Such an event in the operation of the engine is shown at position $c$ in Figure 9. When the circuit is broken through solenoid 111, the spring 108 will move the rod 104 to move the lever 99 to close the throttle 27. Simultaneously therewith the solenoid 93 which previously had moved the valve 77 into the bypass position will be de-energized, thus allowing the spring 92 to move the valve 27 into a position in which the valve will provide a continuous flow of fuel through the passage 72. When this occurs, it will be apparent that fuel will be supplied to all eight of the cylinders of the engine and that the quantity of air supplied by the manifold inlet 30 will be reduced by the closing movement of the throttle valve 27. When the flow of air is reduced through the manifold inlet, the difference in pressure in the chambers 34 and 36 will be decreased, thereby causing the diaphragm 41 to open the valve 58 to reduce the fluid pressure in the distribution chamber 61. Such reduction of fuel pressure in the chamber 61 will cause all of the cylinders of the engine to be supplied with the same amount of fuel that the four operating cylinders previously burned and the engine torque will remain constant. However, the maximum torque which all eight cylinders of the engine may develop may be obtained by further depressing the accelerator pedal beyond position c and into the fully wide-open position of the throttle as indicated.

When the throttle is closed by releasing the accelerator pedal 102 the reverse of the operations previously described will take place, if the accelerator pedal is released slowly. If released completely the engine will continue to operate on eight cylinders until the engine idle position of the throttle is reached. There is enough inertia and friction in the parts to cause the valves 77 and 78 to not operate under such quick release conditions.

It will be apparent from Figures 9 and 11 that the position of the stop 106 is determined by the speed of the engine 10 so that the closing movement of the lever 99 is also determined by the speed of the engine. If the vehicle operator does not desire to operate the engine under the most efficient torque producing conditions, the operator may open the circuit through the solenoids 93, 94 and 111 by opening the switch 128. Also the thermostat 129 will not allow the circuit to be closed until the engine temperature has reached a predetermined value.

The structure of the bypass valve mechanism disclosed by Figure 7 is designed to eliminate the bypass passage 74, the bypass valve 77 and the solenoid 93 in the structure disclosed by Figure 8. The simplified structure will act to operate the cylinders of the engine without alternating between groups of cylinders less than the total number of cylinders of the engine. Under such circumstances the switch 117 will be designed to operate without the alternating feature. The switch will merely operate the solenoid 94, when the contacts 112 and 113 are engaged.

I claim:

1. An internal combustion engine comprising a plurality of cylinders, means controlling the supply of fuel to said cylinders for operating said cylinders in accordance with engine requirements, means for supplying air to said cylinders, means for changing said supply of fuel to said cylinders to different groups of said cylinders, means for changing the quantity of said air supplied to said cylinders as said supply of fuel is changed between said different groups, and means responsive to the temperature of said engine for rendering said fuel and air changing means inoperative.

2. An internal combustion engine comprising a plurality of cylinders, means for supplying fuel and air to said cylinders in accordance with engine requirements, means for changing the number of said cylinders to which said fuel is supplied, means for changing the quantity of air supplied to said cylinders as the number of said cylinders to which said fuel is supplied is changed, and means causing the fuel and air changing events to occur simultaneously and in response to the speed and temperature of the engine.

3. An internal combustion engine comprising a plurality of cylinders, means controlling the supply of fuel to said cylinders for operating said cylinders in accordance with engine requirements, means for supplying air to said cylinders, a throttle in said air supplying means, means responsive to the idling position of said throttle for supplying fuel to all of said cylinders, means responsive to a predetermined opening movement of said throttle beyond said idling position for discontinuing the supply of fuel to one group of said cylinders and for increasing the supply of fuel to another group of said cylinders, and means for alternating the fuel flow between said groups of cylinders during the said predetermined opening movement of said throttle.

4. An internal combustion engine comprising a plurality of cylinders, means controlling the supply of fuel to said cylinders for operating said cylinders in accordance with engine requirements, means for supplying air to said cylinders, a throttle in said air supplying means, means responsive to the idling position of said throttle for supplying fuel to all of said cylinders, means responsive to a predetermined opening movement of said throttle beyond said idling position for discontinuing the supply of fuel to one group of said cylinders and for increasing the supply of fuel to another group of said cylinders, means for alternating the fuel flow between said groups of cylinders during the said predetermined opening movement of said throttle, and means for incrementally opening said throttle a fixed amount simultaneously with the discontinuance of the fuel supply to one of said groups of cylinders.

5. An internal combustion engine comprising a plurality of cylinders, means controlling the supply of fuel to said cylinders for operating said cylinders in accordance with engine requirements, means for supplying air to said cylinders, a throttle in said air supplying means, means responsive to the idling position of said throttle for supplying fuel to all of said cylinders, means responsive to a predetermined opening movement of said throttle beyond said idling position for discontinuing the supply of fuel to one group of said cylinders and for increasing the supply of fuel to another group of said cylinders, means for alternating the fuel flow between said groups of cylinders during the said predetermined opening movement of said throttle, and means for incrementally opening said throttle a fixed amount simultaneously with the discontinuance of the fuel supply to one of said groups of cylinders, the means for alternating the fuel flow also maintaining the incremental opening of said throttle.

6. An internal combustion engine comprising a plurality of cylinders, said cylinders being divided into a plurality of groups, means for supplying fuel to said cylinders, a fuel valve for each of said cylinder groups, means normally biasing each valve to a position permitting fuel to flow to the associated group of cylinders, means for supplying air to the cylinders, a throttle in said air supplying means, said valves being adapted to supply fuel to said cylinder groups when the throttle is in idling position, throttle position-controlled means for actuating each valve to bypass the fuel supplied thereto back to the fuel supplying means discontinuing the fuel flow to the associated cylinder group, and means for alternating actuation of valve actuating means whereby each cylinder group will alternately power said engine when the throttle reaches a given position.

7. An internal combustion engine as defined in claim 6 in which said throttle position-controlled means comprises a solenoid for actuating each valve, a throttle controlled switch for energizing an electric circuit, and a sequentially operating switch in said circuit for alternately energizing said solenoids.

8. An internal combustion engine as defined in claim 7 in which said electric circuit includes a manual switch and an engine temperature responsive switch in series with the sequentially operating switch.

9. An internal combustion engine as defined in claim 8 in which said electric circuit includes a solenoid device operatively connected to said throttle valve, said device incrementally opening said throttle when said switches are closed.

References Cited in the file of this patent

UNITED STATES PATENTS

| | | |
|---|---|---|
| 2,166,968 | Rohlin | July 25, 1939 |
| 2,250,814 | Rohlin | July 29, 1941 |
| 2,431,516 | Starr | Nov. 25, 1947 |
| 2,528,983 | Weiss | Nov. 7, 1950 |
| 2,623,617 | Snyder et al. | Dec. 30, 1952 |
| 2,652,038 | Winkler | Sept. 15, 1953 |